(12) United States Patent
Schmitz et al.

(10) Patent No.: US 8,016,121 B2
(45) Date of Patent: Sep. 13, 2011

(54) DROPLET SEPARATOR SYSTEM

(75) Inventors: Jürgen Schmitz, Aachen (DE); Peter Wandres, Aachen (DE)

(73) Assignee: Munters Euroform GmbH, Aachen (DE)

( * ) Notice: Subject to any disclaimer, the term of this patent is extended or adjusted under 35 U.S.C. 154(b) by 1040 days.

(21) Appl. No.: 11/596,165

(22) PCT Filed: May 10, 2005

(86) PCT No.: PCT/DE2005/000861
§ 371 (c)(1),
(2), (4) Date: Sep. 7, 2007

(87) PCT Pub. No.: WO2005/110579
PCT Pub. Date: Nov. 24, 2005

(65) Prior Publication Data
US 2008/0142430 A1    Jun. 19, 2008

(30) Foreign Application Priority Data

May 11, 2004  (DE) .................. 10 2004 023 097
Dec. 6, 2004  (DE) .................. 10 2004 058 701

(51) Int. Cl.
*B01D 25/00*   (2006.01)
*B01D 45/08*   (2006.01)
*B01D 45/00*   (2006.01)
(52) U.S. Cl. .......... 210/456; 210/320; 210/188; 55/423; 55/421; 55/440; 96/189; 96/300; 96/356; 96/358

(58) Field of Classification Search .................. None
See application file for complete search history.

(56) References Cited

U.S. PATENT DOCUMENTS

| 2,168,512 | A | * | 8/1939 | Browning | 55/308 |
| 3,479,803 | A | * | 11/1969 | Smith | 55/500 |
| 4,061,478 | A |   | 12/1977 | Hartwick |  |
| 4,738,698 | A |   | 4/1988 | Holcblat |  |
| 4,971,613 | A | * | 11/1990 | Valliant | 55/440 |
| 5,885,455 | A | * | 3/1999 | Graus et al. | 210/445 |

FOREIGN PATENT DOCUMENTS

| DE | 598475 B | 6/1934 |
| DE | 2714229 A | 2/1978 |
| JP | 09096209 B | 4/1997 |

* cited by examiner

*Primary Examiner* — Nam Nguyen
*Assistant Examiner* — Madeline Gonzalez
(74) *Attorney, Agent, or Firm* — Andrew Wilford

(57) ABSTRACT

Disclosed is a droplet separator system which is disposed in or on a flow duct and is used for separating liquid and/or solid particles from the medium flowing in the flow duct. The system comprises a frame with a base plate, a cover plate, and a trough that is located at the bottom end of the frame and is used for collecting and discharging liquids/solids, a cap area and a lateral area. A plurality of profiled droplet separators (3) is retained by the frame. The frame is provided with at least one device for deflecting and/or increasing the resistance and/or reducing the rate of the flow, the device being arranged in and/or adjacent to the trough area, cap area and/or lateral area of the frame. This allows entrainments or leakage flows to be largely eliminated.

16 Claims, 3 Drawing Sheets

DROPLET SEPARATOR SYSTEM

CROSS REFERENCE TO RELATED APPLICATIONS

This application is the US national stage of PCT application PCT/DE2005/000861, filed 10 May 2005, published 24 Nov. 2005 as WO2005/110579, and claiming the priority of German patent application 102004023097.8 itself filed 11 May 2004 and German patent application 102004058701.9 itself filed 6 Dec. 2004, whose entire disclosures are herewith incorporated by reference.

FIELD OF THE INVENTION

The present invention is directed to a droplet separator system which is disposed in or at a flow duct and which is used for separating liquid and/or solid particles from the medium flowing in the flow duct. The system comprises a frame with a bottom plate, a cover plate and a trough area that is located at the bottom end of the frame lower than the bottom wall of the flow duct and which is used for collecting and discharging liquids/solids, an upper area and a side area as well as a plurality of droplet separator profiles disposed parallel with respect to one another and held by the frame.

BACKGROUND OF THE INVENTION

Such droplet separator systems are known and are used in a generally satisfying manner. However, especially at high flow velocities or high impact pressures problems can occur, with such droplet separator systems by the used frame system although the profiles as such are suited for such high flow velocities and impact pressures as regards the separation capacity. Especially, such problems are caused by the trough area at the lower frame end since an entrainment of the liquid collected in the trough area or of the corresponding solid can occur by the very high flow velocities. In order to avoid such an entrainment one has already disposed the trough area below the bottom wall of the flow duct so that with laminar flow conditions the trough area should not be contacted by the flowing medium at all. However, in practice a certain part of the flow enters into the trough area and emerges again at the end of the trough area from the same wherein the already mentioned entrainment is caused by the corresponding upward, flow. Accordingly, although the droplet separator profiles as such are suited for such high flow velocities as regards the separation capacity, such capacity is reduced on the whole by the liquid or solid particles which are again taken up by the flow or a part of the separation capacity is again annihilated.

Accordingly, with such high velocity applications the separation capacity is no more primarily dependent on the formation of the special separation profile but is dependent on the whole figuration Of the droplet separator system, for instance the arrangement or design of the trough area thereof.

In order to avoid such entrainment problems from the trough area one could increase the dimension with which the droplet separator system projects downwardly beyond the flow duct (height of the trough area) in order to enlarge the distance of the liquid/solid level within the trough area up to the bottom wall of the flow duct. However, this has the disadvantage that the droplet separator system or the corresponding frame has to be designed especially large which brings along increased costs of material and an increased need of space.

Furthermore, such frames have an upper area formed by the Cover plate and a side area which can also project beyond the cross-section of the flow duct. In these areas problems can occur either wherein here especially leakage problems can occur if the flow with high velocity enters these areas. By this also the separation capacity of the droplet separator system is reduced.

OBJECT OF THE INVENTION

The present invention has the object to provide a droplet separator system of the above-cited kind which is characterized on the whole by an especially high separation capacity and a comparable small size.

SUMMARY OF THE INVENTION

According to the invention this object is achieved with a droplet separator system of the cited kind by the features that the frame includes at least one device for deflecting and/or increasing the-resistance and/or for reducing the velocity of the flow which is located in and/or adjacent to the trough area, upper area and/or side area of the frame.

With the inventive solution measures are carried out in order to prevent that the real separation capacity of the droplet separator profiles is again reduced by problems of the whole configuration of the droplet separator system. In other words, by the inventive measures the admissible flow velocity of such droplet separator systems can be increased. According to the invention at least one device for deflecting, increasing the resistance or reducing the velocity of the flow is provided wherein this device is located in or adjacent to at least one problematic area, i.e. trough area, upper area or side area. A device provided for deflecting the flow has the effect that the flow predetermined by the cross-Section of the flow duct is deflected as far as possible so that it does not enter the problematic areas and no entrainments or leakages occur in these areas. This means that the cross-section of flow predetermined by the cross-section of the flow duct is deflected from the problematic areas or is narrowed at its entrance into the droplet separator system so that no flow portions can enter the problematic areas.

Another inventive measure is directed to the increasing of the flow resistance. Preferably, such a device is provided in the problematic area (trough area, upper area or side area) itself in order to generate a banking effect with respect to flow portions entering these areas and to decrease in this manner the flow velocity in these areas in order to prevent an entrainment or leakages.

Still another measure is directed to the arrangement of a device for reducing the flow velocity. Such a device also has generally the object to reduce the flow velocity or velocity peaks and to prevent thereby an entrainment or leakage flows. Preferably, such a device is arranged at the inlet end of the droplet separator system in order to reduce in this area velocity peaks caused by the flow deflection.

As already mentioned, the droplet separator system constructed according to the invention is especially suited for systems with high flow velocities and high impact pressure since the above-cited problems occur in an increased manner with these systems. According to the invention it is prevented that the separation capacity of the droplet separators which is good as such is again reduced by the above-cited problems of the system. Such cases of application for which the invention is especially suited are for instance combustion engines, especially Diesel engines, but also compressors and many other fields of application, especially in the range of chemistry, natural gas etc. With the inventive solution one succeeds in providing a high-velocity separator or high-capacity separator suited for such systems.

The droplet separator profiles themselves are not critical for the present invention. Any known profiles can be used which, however, should be preferably suited for such high velocity. or high capacity cases in order to not annihilate the advantages obtained by the invention by a reduced separation of the droplet separator profiles.

According to a preferred embodiment of the invention the device for increasing the flow resistance is formed as rib located in or adjacent to the trough area, upper area and/or side area. Preferably, such a rib is located in the problematic area itself, especially in the trough area. By this the high velocity flow portion entering the trough is banked up so that liquid entrainments do not occur or are reduced. Accordingly, by blocking or increasing the resistance the flow velocity is reduced out of the problematic range and an entrainment is avoided thereby. Furthermore, a better separation in the area in front of the rib is obtained by this banking up effect. Moreover, leakage flows are avoided and problematic velocity peaks are removed.

Similar effects are obtained if a rib is arranged in the upper area or in the side area.

Another preferred embodiment of the invention is characterized in that the device for the flow deflection is formed as wedge located in and/or adjacent to the trough area, upper area and/or side area. With "wedge" any continuous restriction of the cross-section is meant. Preferably, such a wedge is provided at the transition point between the flow duct and the droplet separator system. By this a flow deflection occurs so that problematic areas are not directly applied by the high velocity flow. Possible velocity peaks in the problematic or critical areas are degraded or reduced by this. Preferably, such a wedge is located adjacent to the trough area of the droplet separator system in order to cause an upwardly directed deflection of the flow coming from the flow duct and to prevent in this manner diving flows into the trough area. By this it is achieved that the trough area is largely located outside of the flow so that no entrainments occur.

According to still another embodiment of the invention the device for reducing the flow velocity is formed as perforated plate arranged in and/or adjacent to the trough area, upper area and/or side area. Preferably, such a perforated plate is also located at the transition point between the flow duct and the droplet separator system. By this, the gas flow is changed in such a manner that velocity peaks in the critical areas are avoided or peaks which are present as non-uniform distribution in front of the droplet separator system are equalized. Furthermore, a reduction of the velocity peaks is obtained which are caused by an inventive deflection of the flow (for instance by means of a provided wedge). Accordingly, the perforated plate is located contiguous to the wedge in order to again equalize the velocity peaks generated by the flow deflection through the wedge. If the wedge is arranged contiguous to the trough area the perforated plate is preferably located above the wedge.

Dependent on the application the three above-cited inventive devices for the deflection of, increasing the resistance of and reducing the velocity of the flow are to be combined and to be optimized. A corresponding optimization can be achieved by empirical tests with consideration of the respective special circumstances. So, for instance, it can be already sufficient to arrange a single rib in the trough area in order to avoid entrainments of the separated substances. Preferably, such a rib is used in combination with a wedge arranged adjacent to the trough area and with a perforated plate arranged thereabove. The wedge generates a deflection of the flow so that only small flow portions can enter the trough area. The perforated plate arranged above the wedge reduces the velocity peaks generated by the deflection, and the rib blocks a still present upward flow out of the trough area which results in entrainments.

Of course, simultaneously several devices for the flow deflection, for increasing the flow resistance or for reducing the flow velocity can be present, for instance several ribs, several wedges or several perforated plates.

If a rib is provided within the trough area it divides the same into two compartments which preferably have each separated outlets.

Preferably, the device for increasing the flow resistance, especially the rib, is arranged in the frame half located downstream. By this it is achieved that the separation is largely carried out in the forward, i.e. upstream part of the frame, by the obtained banking up of the flow whereby the downstream frame half is relieved. Thereby, an upward component of the flow in the downstream frame half is avoided. This is especially important since hereby no entrainments can occur in this critical area which would reduce the separation capacity of the droplet separator system.

Another measure to avoid such entrainments consists with a droplet separator system with droplet separator profiles having capturing noses in the feature that the at least one outlet provided in the trough area is located behind the capturing noses in flow direction. By this the effect results that the largest impact pressure present in the area of the capturing noses (capturing pockets) cannot enter into the outlet since the same is located behind the capturing noses (capturing pockets) cannot enter into the outlet since the same is located behind the capturing noses in flow direction. Accordingly no strong upward flow is generated which can have a disadvantageous effect on the flow conditions and can result in entrainments.

Preferably, the outlet is located immediately behind the capturing noses in order to make the distance between the point of the greatest separation and the outlet as small as possible.

As mentioned above, a preferred embodiment is characterized by the feature that the rib divides the trough area into two compartments with separated outlets. In this embodiment, practically the outlet provided behind the rib in flow direction is located behind the capturing noses of the droplet separator profiles. It is secured in this manner that in the critical area, i.e. in flow direction behind the rib, no entrainments are generated from the outlet since the outlet is displaced from the area of the largest impact pressure below the capturing noses in flow direction to a point behind the capturing noses.

According to the invention the device for deflecting and/or increasing the resistance and/or reducing the velocity of the flow can be arranged in the droplet separator profile area or ahead of the same or therebehind. Practically, the device for increasing the flow resistance (rib) is located within the droplet separator profile area while devices for the flow deflection and for reducing the flow velocity (wedge, perforated plate) are preferably arranged ahead of the droplet separator profile area. However, this does not exclude that such devices can be also arranged in flow direction behind the real droplet separator profile area.

Preferably, the device for deflecting the flow is formed as wedge. According to another embodiment it is formed as closed plate. This embodiment secures an especially good possibility of mounting.

As regards the design of the perforated plate, the same can be formed in such a manner that an especially high velocity reduction takes place in the lower area of the perforated plate wherein the velocity reduction stepwise or continuously decreases upwardly. This can be achieved by the fact that the perforated plate has holes with a hole diameter which increases from below to above. According to another embodiment several perforated plates with holes with different sizes are disposed one above the other wherein preferably the perforated plate with the smallest holes is located below.

As regards the design of the rib, an embodiment is especially suited according to which the rib is formed in a comb-like manner wherein the individual prongs of the comb extend into the spaces between the droplet separator profiles from below and substantially block the same.

According to another embodiment the rib is formed by blocking members for the separator profile intermediate spaces mounted to the droplet separator profiles. These blocking members can be formed angularly in order to provide an abutment surface at the droplet separator profiles. This abutment surface can be welded or adhered to the profiles. It is essential that the intermediate spaces or passages between the individual profiles are substantially blocked in all embodiments.

According to still another embodiment the rib is formed as straight continuous plate and the droplet separator profiles are slotted and sit on the droplet separator plate.

Accordingly, the inventive teaching provides several possibilities of a flow deflection function outside of the real droplet separator profiles. It is preferably used with high capacity separators which are used, for instance, with Diesel engines of ships, large Diesel engines, Diesel engines of power stations.

The provided measures are used in and/or adjacent to the trough area, upper area and/or side area of the frame of the droplet separator system.

BRIEF DESCRIPTION OF THE DRAWING

In the following the invention is described by means of an example in connection with the drawing in detail. In the drawing

SPECIFIC DESCRIPTION

Figure 1:
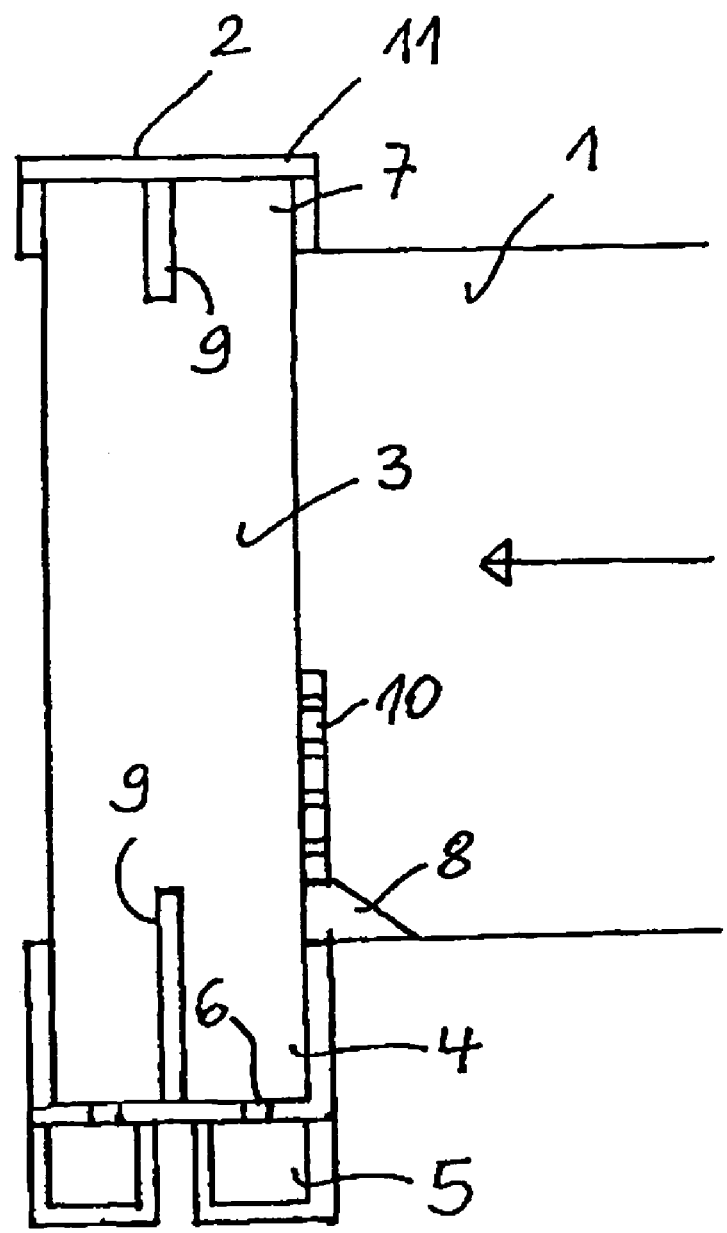
FIG. 1 shows a schematic vertical section through a part of a flow duct with adjoining droplet separator system.

FIG. 1 shows a part of a flow duct 1 through which a gaseous medium loaded with a liquid flows. The flow direction is indicated by the arrow. The flow duct 1 runs into a droplet separator system 2 in order to separate the liquid present in the medium. This droplet separator system 2 consists of a frame 11 which has two side walls 12 (shown in FIG. 2), an upper area 7 and a lower trough area 4. The upper area 7 is located above the flow duct 1 while the trough area 4 is located below the flow duct. A plurality of vertically and parallel droplet separator profiles 3 is arranged within the frame 11. These droplet separator profiles are lamella separator profiles of a known construction. The droplet separator profiles are not shown in detail here. Since they are known no further details of them have to be discussed. A separation of liquid droplets is achieved by flow deflection caused by the lamella profiles wherein such that the liquid droplets flow downwardly along the profiles and are collected in the trough area 4. The trough area 4 has at its bottom slot-like outlets 6 through which the collected liquid can reach channels 5 arranged therebelow through which the liquid is discharged.

Figure 2:
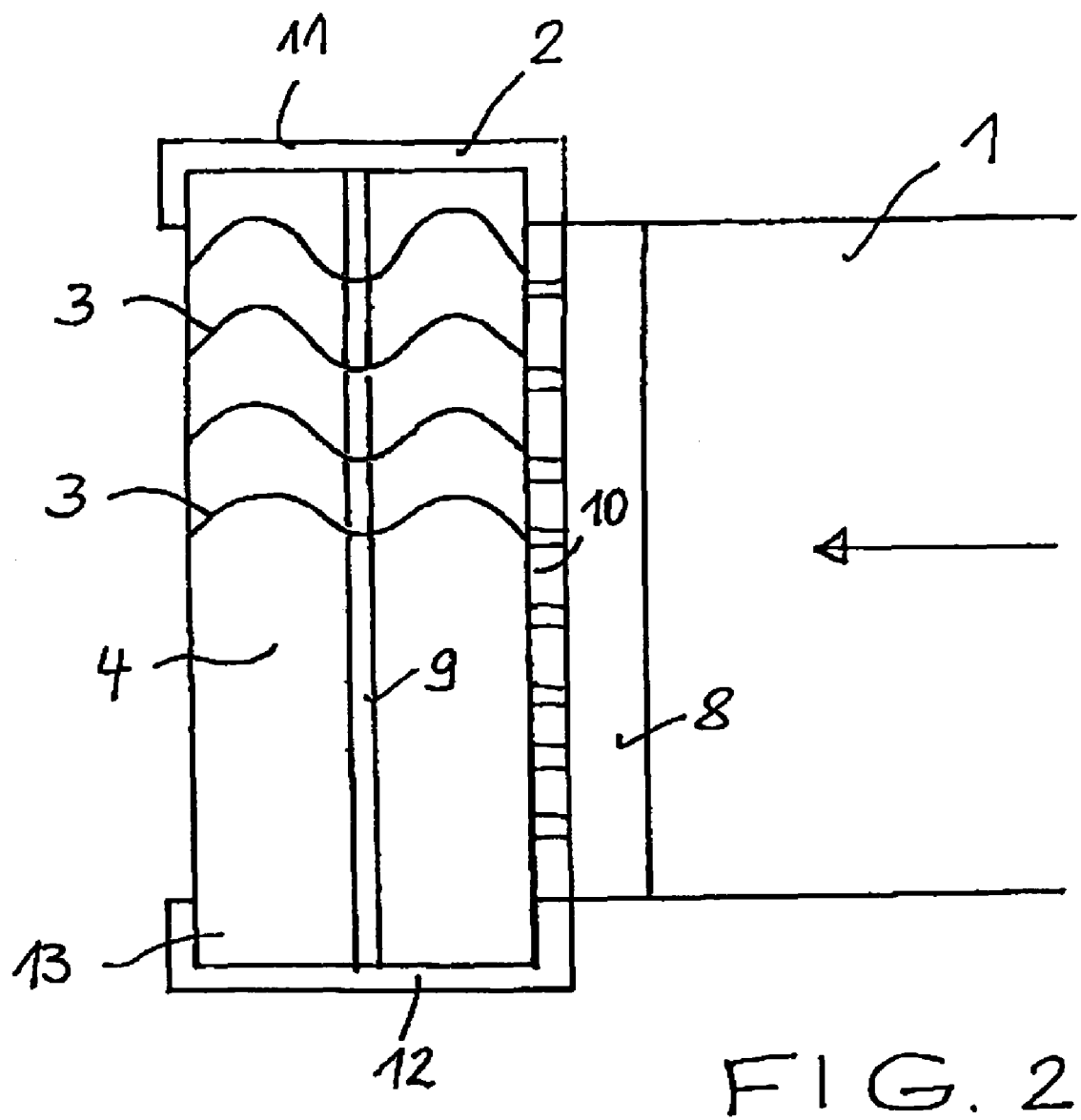
FIG. 2 shows a horizontal section through the flow duct with droplet separator system according to FIG. 1.

The droplet separator system shown in FIGS. 1 and 2 has on account of its design substantially problematic areas which can cause separation problems, especially with very high flow velocities of the medium flowing in the duct, i.e. which can again reduce the good and adequate separation capacity for the high flow velocity which is achieved by the droplet separator profiles. This concerns the lower trough area 4, the upper area 7, and side areas 13 adjacent to the side walls 12. If portions of the gas flow flowing with high velocity enter these areas entrainment of liquid or leakage flows can be generated which, on the whole, cause a reduction of the separation capacity.

In order to avoid these problems a wedge-like flow deflection device 8 is provided at the transition point between the flow duct 1 and the droplet separator system 2 in the lower area of the flow duct. This wedge-like flow deflection device deflects the flow upwardly and prevents flow portions from entering the trough area 4. A perforated plate 10 is disposed above the device 8 and serves for the reduction of the flow velocity peaks generated by the flow deflection. Accordingly, the perforated plate 10 again causes an equalizing of the flow velocity over the now reduced cross-section of the flow through the droplet separator system. Furthermore, a rib 9 is provided within the trough area 4. This rib divides the trough area approximately in the center and protrudes from the bottom plate of the trough area upwardly to the height of the wedge-like deflection device 8. This rib 9 serves for increasing the flow velocity of the flow portion moving down into the trough area 4 in spite of the devices 8 and 10 and thus has the effect that no upward flow with high velocity can be generated which can entrain the liquid collected in the trough area 4. A corresponding rib is provided in the upper area 7 and extends also from the cover plate of the frame approximately centrally downwardly over a small distance into the cross-section of the flow duct 1. This rib has corresponding banking objects in the upper area.

Accordingly, a largely uniform flow (apart from the flow deflections achieved by the droplet separator profiles themselves) at the outlet is obtained by the provided measures since the entering of flow portions into the trough area and the upper area is largely avoided. According to this embodiment in the side portions 13 of the droplet separator system no special measures are provided. However, of course this can be also the case.

Figure 3:
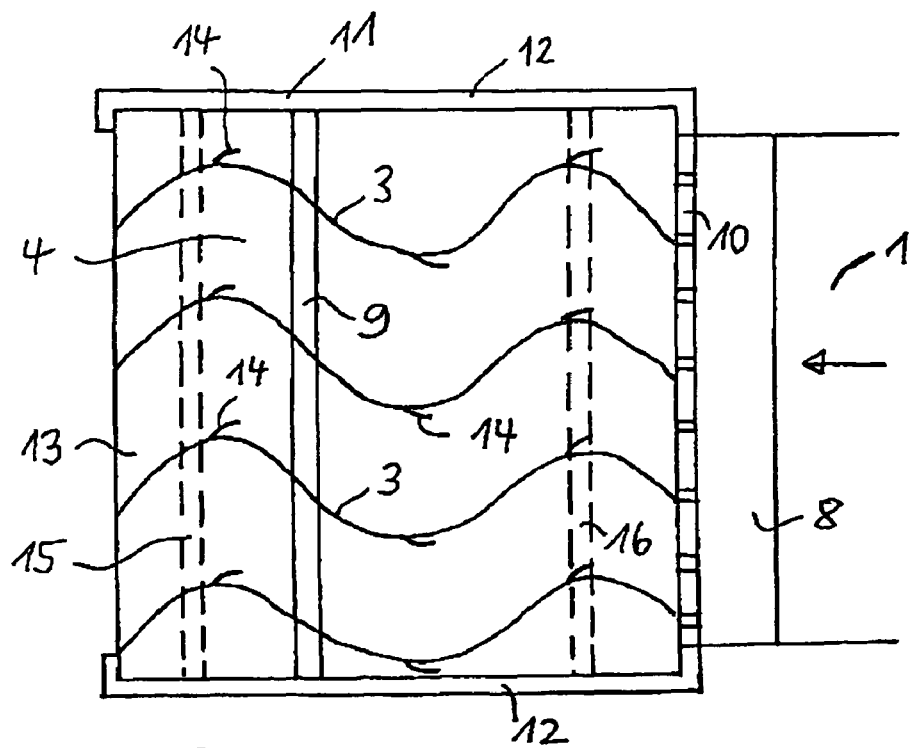
FIG. 3 shows a horizontal section through the flow duct of another embodiment of a droplet separator system.

FIG. 3 shows a horizontal section through the flow duct of another embodiment of a droplet separator system. In the following only these parts are described by which the system differs from the droplet separator system shown in FIGS. 1 and 2.

In the droplet separator system shown in FIG. 3 the frame 11 is correspondingly formed as with the embodiment of FIGS. 1 and 2 and has also two side walls 12, a upper area and a lower trough area 4. In the frame 11 a plurality of vertically and parallel droplet separator profiles 3 are arranged which are lamella separators of a known construction. These droplet separator profiles are only shown schematically and are formed in a lamella-like manner. At the respective wave peaks they have capturing noses 14 which increasingly open against the flow direction so that capturing pockets are formed. Such profiles with capturing noses are known so that their function does not need to be described in detail.

By the flow deflection caused by the lamella profiles a separation of liquid droplets is realized which flow downwardly along the profiles and which are collected in the trough area 4. The strongest separation takes place within the area of the capturing noses 14 or capturing pockets since here the greatest impact pressure is present.

Also with this embodiment a rib 9 is provided in the trough area 4 wherein the rib is similarly formed as the rib of the embodiment of FIGS. 1 and 2. However, in contrast to the embodiment of FIGS. 1 and 2 this rib is not disposed centrally in the frame but within the downstream frame half. It is in any case avoided by the elevation of the flow resistance obtained by the rib that in the downstream area, i.e. the area behind the rib in the flow direction, an upward flow takes place which might result in entrainment.

This effect is further increased by the feature that the discharge slot 15 arranged in this area is not disposed directly below the capturing noses 14 but is located behind them in the flow direction. In this manner the discharge slot 15 is displaced from the area of the highest impact pressure which also serves to avoid entrainment.

The discharge slot 16 in the upstream area (seen from the rib 9) is located approximately centrally in this area and is disposed below the capturing noses 14 which are arranged there. A downward displacement of the flow into the discharge slot is allowed in this area in which the greatest separation takes place. The liquid possibly entrained hereby is separated then in the following areas.

Figure 4:
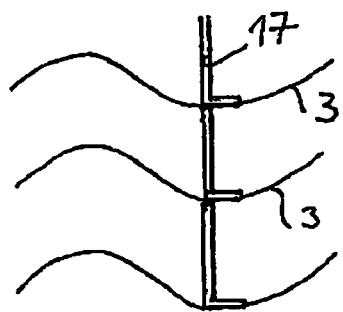
FIG. 4 shows a schematic top view of a special embodiment of a rib.
Figure 5:
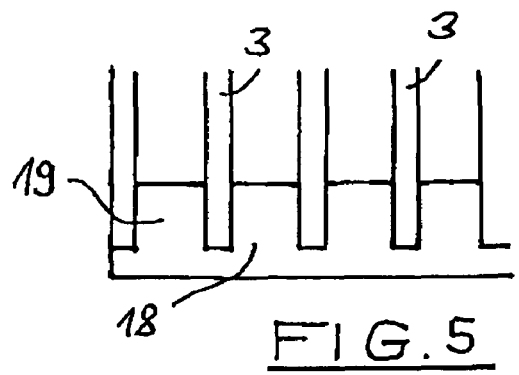
FIG. 5 shows a schematic front view of another embodiment of a rib.

FIGS. 4 and 5 show different embodiments of the rib 9. According to the embodiment shown in FIG. 4 the rib is formed by a plurality of blocking members 17 mounted on the droplet separator profiles 3 and blocking the intermediate spaces between the droplet separators or the passages. The blocking members are angularly formed and each abut with one surface on the respective droplet separator profile. This surface can be welded or adhered to the profiles.

According to the embodiment schematically shown in FIG. 5 the rib 18 is integrally formed and has the shape of a comb whose teeth 19 extend upwardly into the passages between the droplet separator profiles. The rib 18 can be fastened to the frame of the droplet separator system.

Figure 6:
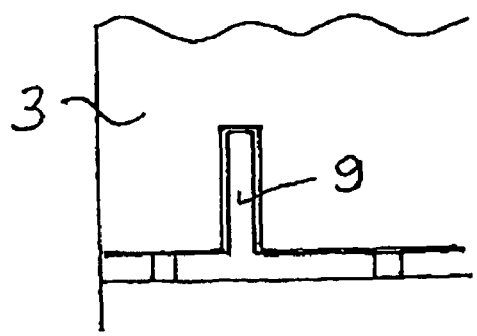
FIG. 6 shows a schematic side view of a rib according to still another embodiment.

According to the embodiment shown in FIG. 6 the rib 9 is formed as straight continuous plate while the droplet separator profiles 3 are slotted and sit on the plate.

Finally, the droplet separator profiles preferably extend to the bottom of the trough area.

The invention claimed is:

1. In combination with a duct in which droplet-laden air is flowing in a horizontal flow direction, a droplet separator comprising:
    a frame having a bottom plate, a top plate, and a pair of side plates bridging the top and bottom plates, the frame aligned in the direction with the duct and receiving the air flow therefrom, the bottom plate forming an upwardly open trough below a lower wall of the flow duct;
    a plurality of droplet-separator profiles extending vertically in the frame above the trough and defining horizontally throughgoing passages generally aligned with the flow direction, whereby droplets are separated from the air flow by impingement on the profiles and flow down into the trough; and
    a flow-restricting rib extending horizontally, vertically, and transversely of the flow direction below and between the profiles across the passages in the trough so as to subdivide a lower region of the trough into separate upstream and downstream compartments.

2. The droplet separator system according to claim 1, further comprising
    a flow-restricting wedge in the trough.

3. The droplet separator according to claim 2, wherein the wedge is arranged at a transition point between the flow duct and the droplet separator.

4. The droplet separator system according to claim 1, further comprising
    a perforated plate in or adjacent to the trough.

5. The droplet separator system according to claim 4, wherein the perforated plate is contiguous to the wedge.

6. The droplet separator system according to claim 4, wherein the perforated plate is formed with holes of increasing hole diameter from below to above.

7. The droplet separator system according to claim 4, wherein several such perforated plates are disposed one above the other.

8. The droplet separator system according to claim 1, wherein each of the compartments has a respective outlet.

9. The droplet separator system according to claim 8, wherein an outlet is provided behind the rib in the flow direction downstream of the capturing noses.

10. The droplet separator system according to claim 1, wherein the rib is arranged in a downstream half of the frame.

11. The droplet separator system according to claim 1, wherein the droplet separator profiles are provided with capturing noses, the trough having at least one outlet which is arranged behind the capturing noses in the flow direction.

12. The droplet separator system according to claim 11, wherein the outlet is arranged immediately behind the capturing noses.

13. The droplet separator system according to claim 1, wherein the rib is a closed plate.

14. The droplet separator system according to claim 1, wherein the rib is a comb having teeth that extend from below into spaces between the droplet separator profiles.

15. The droplet separator system according to claim 1, wherein the rib is formed by blocking members for the passage and mounted on the droplet separator profiles.

16. The droplet separator system according to claim 1, wherein the rib is a straight continuous plate on which slotted droplet separator profiles sit.

* * * * *